Patented Oct. 5, 1926.

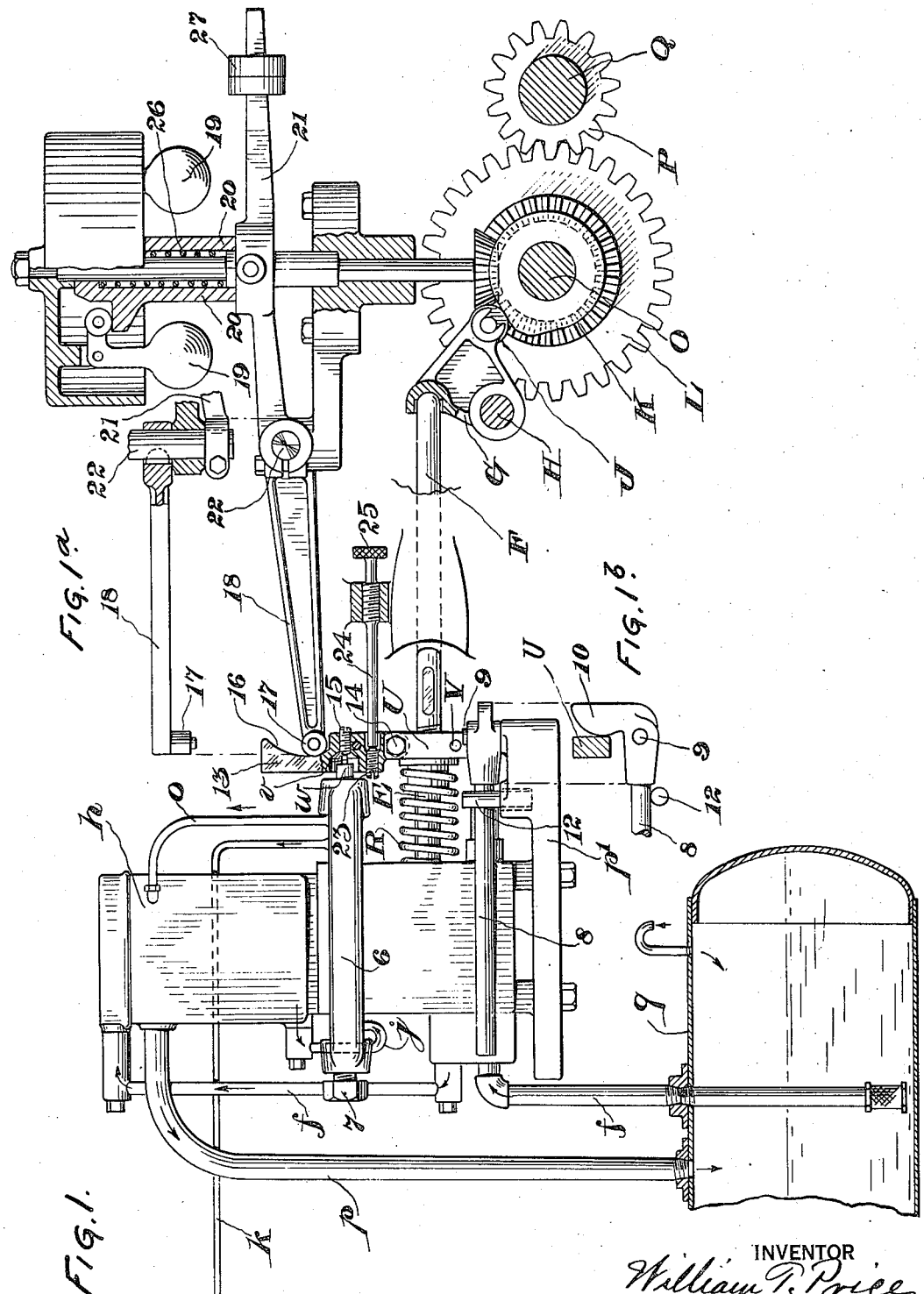

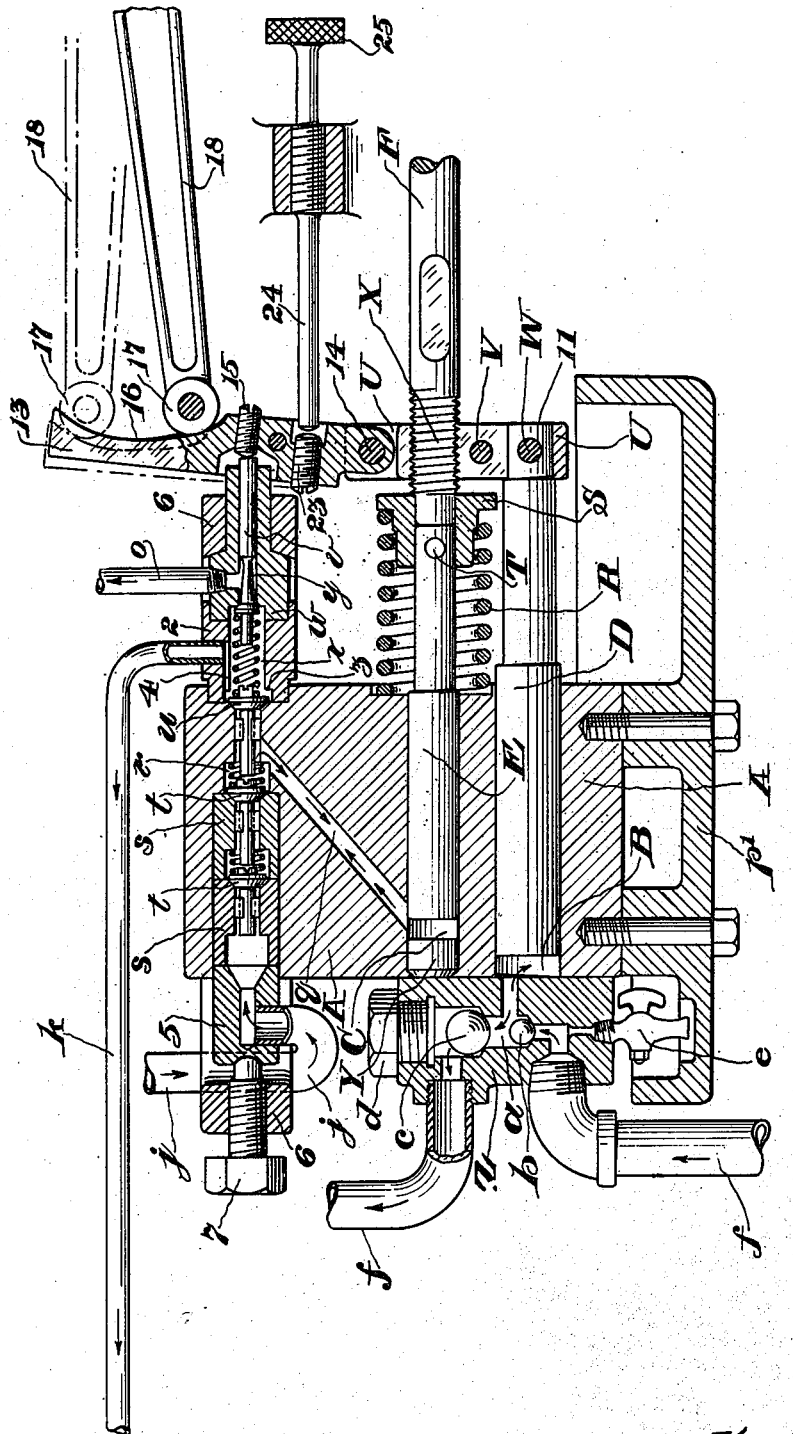

1,602,208

UNITED STATES PATENT OFFICE.

WILLIAM T. PRICE, DECEASED, LATE OF EASTON, PENNSYLVANIA; BY HELEN CORNELIA PRICE, EXECUTRIX, OF EASTON, PENNSYLVANIA, ASSIGNOR TO PRICE ENGINE CORPORATION, OF NEW YORK, N. Y., A CORPORATION OF NEW YORK.

FUEL REGULATION FOR INJECTION-TYPE ENGINES.

Application filed May 14, 1921. Serial No. 469,435.

This invention relates to fuel regulation for injection type internal combustion engines, in which liquid fuel is injected by a pump without the use of injection air, and more particularly to the regulation of that class of injection engines in which the liquid fuel is injected during the latter part of the compression stroke.

The invention is in some respects a modification, and in other respects a development of the variable delivery fuel pump disclosed in the co-pending application of George J. Rathbun and myself, Serial No. 399,933, filed July 29, 1920.

Its objects are to improve the control of the amount and period of the injection in engines of the type referred to in order to maintain efficient combustion under wide ranges of speed and load, and also to accomplish these results by rugged mechanism operating in a direct and simple manner without liability of derangement in use.

Fuel pumps for engines of the type referred to are commonly provided with means to allow the escape of a variably regulated portion of the pump stroke volume thereby regulating the amount of fuel pumped to the engine and such regulation is sometimes effected by the control of the suction valve of the pump but is more generally by the control of a special escape or by-pass valve which is opened at variable points towards the end of the discharge stroke of the pump. Another object of this invention is to control such an escape so that its closure as well as its opening may take place during the discharge stroke of the pump and so that the time of such closure and opening may, one or both, be varied in accordance with the operating condition of the engine. By such means I am able to change the timing of the injection as a whole according to the speed of the engine, and while the engine is in operation, making it later for some conditions and earlier for others, and also to change the amount of the injection (duration of the injection period) irrespective of the timing. These results may be accomplished automatically, as by governor control, and afford the important advantage that the fuel can be introduced at the most efficient point in the engine cycle irrespective of the position of the piston as will later appear.

To these and other ends, which will hereinafter appear, the invention consists of the apparatus and devices hereinafter fully described and claimed in this specification and shown in the accompanying drawings, in which—

Figure 1 is a side elevation partly in vertical section of a fuel pump and so much of its cooperating and associated parts as will serve to illustrate the invention, and Figure 1ª is a detail top plan view of the controlling arm, Figure 1ᵇ is a detail top plan view of a portion of the priming lever.

Figure 2 is an enlarged detail longitudinal vertical section taken through the pump.

Referring to the drawings, the pump body A is provided with chambers or bores B and C for the fuel supply plunger D and injection plunger E respectively. Suitable means are provided for actuating these plungers from a rotating or reciprocating part of the engine to which the pump is to be applied, and in this instance both plungers are operated from a common plunger rod F, actuated by a follower G, rocking on the shaft H and having a roller J bearing on the pump cam K, driven by the gear L on the cam shaft O geared to the pinion P on the engine crank shaft Q. A plunger spring R on the plunger E, is compressed between the pump body and the spring holder S, secured to the plunger stem by the pin T. The fuel supply plunger D and the plunger rod F are connected together as by means of the split tie member or yoke U, the parts of which are tightened by means of the tap bolt V. The supply plunger D is secured to the yoke as by means of the pin W and the plunger rod F is preferably provided with a screw threaded portion X connecting it to the yoke. Both plungers operate with a constant length of stroke. The pump chamber C is closed by a plug Y, and a head Z is suitably secured to the pump body A over the end of the pump chamber B which head is provided with a valve chamber *a* having the valves *b* and *c*, the valve stop *d* and the pet cock *e*. The supply pipe *f* leads from the tank or source of supply *g* of oil or other fuel, to the valve chamber *a* and from thence the pipe *f* preferably leads to a suitable filter box *h* for filtering the fuel. From the filter *h* the fuel passes through the suction pipe *j* to the injection pump valve chamber *r*, to the pump chamber C, and thence back through the passage q and discharge pipe k to the nozzles or other injecting means of the engine. The return pipe o leads back to the filter h, and an overflow pipe p connects the filter with the tank g. A suitable tray p' is preferably secured below the fuel pump to catch any leakage and return it to the system (thus avoiding the necessity of running a long drain pipe to a remote supply tank.)

In the pump structure shown, two valve cages s seating the suction valves t, are ininserted in longitudinal alignment in the pump body. A discharge valve u prevents the return of oil during the suction stroke of the plunger F, and a valve v preferably operating in a sleeve w, controls the flow to the return pipe o, being seated by the same spring x that also seats the discharge valve u. This valve v and the return pipe o represent the escape above referred to for that portion of the stroke volume of the injection plunger which is not to be discharged to the engine and for this purpose it is adapted to be variably operated as presently described. It is provided with a tapered shank portion y for graduating the escape as in the copending application referred to, Serial No. 399,933, and need not be further described, except to say that in the present case it is mounted to have a relatively long lift. Inasmuch as said valve controls a separate return or by-pass passage back to the filter or source, it is herein termed a by-pass valve, and it is preferable that the escape shall be by way of a separate passage, but it will be apparent from the further description that the principle of regulation herein claimed applies equally well to the control of the suction valve to permit the escape or return of the fuel back through the suction pipe, or to the control of both valves for an equivalent purpose.

The discharge pipe k is preferably connected to a discharge fitting 2 located between the pump body A and the by-pass valve sleeve w and provided with the interior shoulder 3 forming a stop to limit the lift of the discharge valve u. A relief port in the form of a longitudinal groove 4 in the bore of the discharge pipe gland 2 prevents the shutting off of the discharge passage when the discharge valve attains its full lift.

The suction pipe j as shown, is preferably connected to the suction pipe fitting 5, and in order to maintain these parts that is, the discharge pipe fitting 2, the by-pass valve sleeve w and the suction pipe fitting 5 all tight against leakage, but to permit ready assembling and disassembling, I clamp them to each other and to the pump body by means of the fuel pump clamp 6 adapted to embrace or encircle the pump body A and provided with tightening means which may be in the form of a screw 7 for tightening the clamp and holding the parts together. By this means, it will be observed that screw threaded joints, likely to leak under the high pressures which these pumps produce, are eliminated.

A priming lever 8, which may be pivoted on the pin 9 on a convenient location on the pump, as for instance upon the tray p', is provided with a toe or short arm 10 adapted to bear upon the yoke U and enables the pump plungers to be operated by hand when desired. A removable stop pin 12 is preferably provided for maintaining the priming lever 8 in its inoperative position against the pump body when not in use.

The by-pass valve v is automatically actuated by regulating devices applied as directly as possible to the working end of the pump and including a by-pass lever 13, pivoted to the yoke U by pin 14 and extending into operative relation with the by-pass valve v. The by-pass lever 13 as shown is provided with an independently adjustable means to hold the by-pass valve open at the beginning of the pump stroke comprising a set screw 15 or fulcrum adapted to bear against the stem of the by-pass valve v as the lever rocks, and the lever is also provided with a concave bearing surface 16 along which a fulcrum member, which may be in the form of a roller 17 constituting part of the end portion of the controlling arm 18, is adapted to bear at variable points since the end portion of the controlling arm moves longitudinally of the concave bearing surface. The concave curve is predetermined with reference to the characteristics of the governor or control member.

The arm 18, carrying the fulcrum roller 17, may if desired be connected for control by any desired form of speed governor, a ball governor of suitable construction being shown, having balls 19 adapted to depress the sleeve 20 against the tension of the spring 26 upon an increase of speed and carrying the lever arm 21 and weights 27 downwardly, thereby rocking the rock shaft 22 and carrying the lever arm 18 upwardly into the position indicated in dotted lines in Figure 2. Upon an increase of speed, due for instance to light load, the by-pass valve v is opened earlier in the discharge stroke of the pump because the contact of the by-pass lever 13 on the fulcrum roller 17 has been moved away from the pivot 14 or point of application of motion. More oil is therefore by-passed because the by-pass valve opens earlier in the stroke and the speed of the engine is thereby reduced or held within the desired limit. If the speed of the engine falls, or if it is desired to increase it, the fulcrum roller 17 is moved nearer the pivot 14 as indicated in full lines in Figure 2, and the by-pass valve $v$ is then opened later in the discharge stroke of the pump and less oil is by-passed, thereby injecting more oil at each stroke into the engine combustion chamber. The position of the shifting fulcrum 17 thus serves to vary the termination of the pump delivery on each stroke.

In an engine of the type referred to, I have found that the time element during which the injected fuel is subject, within the engine, to the pressure and temperature at the end of the compression stroke should be controlled so that the elapsed time between the beginning of the injection and the point of ignition is not much longer when operating at slow speed than when operating at high speed. Also I have found that at slow speeds the oil is not compressed in the discharge line to the same degree as at high speeds, because the oil pressure does not rise as high, so that the oil is discharged through the nozzles closer in phase with the action of the plunger.

For example, let it be assumed that the injection begins at 35° before compression dead center, when the engine is running at a speed of 240 R. P. M., and that ignition occurs at a point 5° before compression dead center. Let it be further assumed that when operating at full load and maximum speed, the by-pass valve $v$ opens at 5° after dead center. With the speed remaining nearly constant as the load falls off, the centrifugal governor will automatically raise the fulcrum roller 17, so that the by-pass valve will open earlier, and when operating at about half-load, will open perhaps 10° before compression dead center. When the engine is running at 240 R. P. M., the time of one revolution is 1/4 of a second, and the time element represented by 30° of crank angle between the beginning of injection and the point of ignition is 1/12 of 1/4 of a second or 1/48 of a second.

Consider then an operating condition under which the engine torque is a maximum, but it is desired to reduce the speed of the engine from 240 R. P. M. to 60 R. P. M. When the speed is so reduced, the time element between the beginning of injection and the point of ignition would be four times as great as in the former case and would thus be increased from 1/48 of a second to 1/12 of a second, which would have the effect of placing the oil in such a state that the pressure rise would be too abrupt for good operating service, resulting in detonation and so called knocking, which is undesirable.

In order to relieve such conditions, I have provided means for varying the beginning of injection as well as the end of injection, and such means may be operated automatically or by hand as desired, and I have shown a simple form of hand control for illustrative purposes, the adjustment of which will serve to vary the beginning of the injection and thereby control the elapsed time.

This regulation may be obtained in a simple manner by providing the by-pass lever 13 with an adjustable set screw 23 at a point between the pivot pin 14 and the set screw 15, which bears upon the by-pass valve $v$ and by also providing an adjustable stop 24 cooperating with the set screw 23 against which the set screw will bear, as a fulcrum, at or near the end of the suction stroke of the pump plunger, thus rocking the by-pass lever 13 and opening the by-pass valve at a position near the end of the suction stroke so that it remains open until the plunger returns to that position on the discharge stroke. The adjustable stop 24 is adjustable by means of its threaded support or knurled head 25. By the provision of such additional by-pass or escape controlling means, the regulating mechanism cuts out the beginning and the end of injection, and cuts out more or less of the beginning according as stop 24 is advanced or withdrawn. Under the conditions specified for instance, of maximum engine torque and speed reduction from 240 R. P. M. to 60 R. P. M., the stop 24 is adjusted towards the pump to such a point that the set screw 23 on the by-pass lever 13 will strike against the stop and rock the lever 13 to open the by-pass valve $v$ near the end of the suction stroke, and the by-pass valve will remain open during the early part of the discharge stroke, so that the oil will be by-passed back to the supply until a crank angle of perhaps 20° before compression dead center has been reached, at which point the by-pass valve would close and the oil would be injected into the engine until the by-pass valve is again opened by the lever 13 coming in contact with the fulcrum roller 17. It will be observed that the by-pass lever 13 by which these results are accomplished works on two fulcra, one of them—17—being shiftable to change the leverage ratio and the other 24 being adjustable to vary the time of its contact or service as a fulcrum. It will be apparent that either one or other of these fulcra may be adjustable in the same way, that is to say, to vary the leverage ratio, or the time of contact as desired without departing from the principle of control, although I prefer that the termination of the injection period shall be regulated by varying the leverage ratio. The governor, which in this case should preferably have been loaded by adding weights 27 to the arm 21, or by some other loading means, would continue to function and would control and keep the speed of the engine close to that desired, by opening the by-pass valve earlier or later in the discharge stroke of the injection pump plunger.

The type of governor illustrated is especially desirable in carrying out the regulation described, because if the engine is running at 240 R. P. M., for instance, and with a tension on the governor spring 26 such that the centrifugal force of the weights 19 is just sufficient to overcome the tension, the weights 27 may be removed and the governing would take place so that with no load, the speed would be increased perhaps by 20 R. P. M., and on the other hand, if the engine is carrying full torque, it might slow down by 10 R. P. M., at which point the fulcrum roller 17 would have dropped sufficiently far for the engine to receive the required charge of fuel to carry the full load torque. Again if the load is reduced, the engine would speed up by 10 R. P. M., and the weights 19, acting against the spring 26, would cause the fulcrum roller 17 to raise to such a point that the fuel charge would be sufficiently reduced to prevent the engine from speeding up.

Let it be assumed however that it is desired to reduce the engine speed one half or from 240 R. P. M. to approximately 120 R. P. M., in which case sufficient weights 27 should be placed and located on the governor arm 21 to overcome or counteract a sufficient amount or about three-fourths of the expansive force exerted by the spring 26, so that the weights 19 would act at lower engine speed. By adding still more weights 27 or by shifting these weights outwardly, the average speed of the engine may be still further reduced, but I have found, that as the speed is reduced, it is desirable to further adjust the stop 24 in order to delay the point in reference to the crank angle at which the beginning of injection occurs. The set screw 15 in the by-pass lever 13 and the screw threaded portion X of the plunger rod F in the yoke U should preferably be so adjusted that, when the engine is running at full speed, the adjustable stop 24 would have no function and the injection of the fuel would begin with the beginning of the forward motion of the plunger rod F.

Claims:—

1. The combination of a fuel injection pump and control means therefor comprising a double-fulcrumed lever and adjustable fulcra for said lever, the adjustment of one of said fulcra controlling the beginning of the delivery period of the pump and the adjustment of the other controlling the termination of said period.

2. In fuel regulation for injection type engines, a pump having an injection plunger and suction and discharge valves, a by-pass valve, a pivoted by-pass lever operatively connected to said plunger, said by-pass lever having a concave bearing surface, and a governor controlled arm having a fulcrum adapted to bear at variable points along said concave lever surface for varying the leverage in accordance with the load.

3. In fuel regulation for injection type engines, a pump having a plunger and plunger rod, suction and discharge valves, a by-pass valve adapted to open at variable points in the stroke of the plunger, a pivoted by-pass lever carried by the plunger rod and extending into operative relation with the by-pass valve, said by-pass lever having a concave bearing surface, and a governor controlled arm having a fulcrum adapted to bear at variable points along said concave surface, for varying the fulcrum of said lever in accordance with the load.

4. In fuel regulation for injection type engines, a pump having a body, a plunger, a plurality of suction and discharge valves in alignment in said body, a suction pipe fitting, a discharge pipe fitting, a by-pass sleeve, a by-pass valve therein, and a fuel pump clamp for clamping said fitting and sleeve to the pump body.

5. In fuel regulation for injection type engines, a pump having a body, a plunger adapted to reciprocate in a chamber in said body to force fuel from a source of supply to a combusion chamber, means for actuating said plunger, a by-pass valve normally held closed, a by-pass lever operatively connected to the plunger actuating means for opening the by-pass valve, said lever having a concave bearing surface, an arm controlled by a governor and having a fulcrum adapted to bear at variable points along said concave lever bearing surface for controlling the opening of said by-pass valve to vary the amount of fuel admitted to the combustion chamber on the discharge stroke of the pump.

6. In fuel regulation for injection type engines, a pump having a body, a plunger adapted to reciprocate in a chamber in said body to force fuel from a source of supply to a combustion chamber, means for actuating said plunger, a by-pass valve normally held closed, a by-pass lever operatively connected to the plunger actuating means for opening the by-pass valve, said lever having a concave bearing surface, an arm controlled by a governor and having a fulcrum member adapted to bear at variable points along said concave lever bearing surface for controlling the opening of said by-pass valve to vary the amount of fuel admitted to the combustion chamber towards the end of the discharge stroke of the pump, and means for causing the by-pass valve to open at variable points at the end of the suction stroke of the pump.

7. In fuel regulation for injection type engines, a pump having a plunger, suction and discharge valves, a by-pass valve, a pivoted by-pass lever operatively connected to said plunger, said by-pass lever having a concave bearing surface, and a governor controlled arm having an end portion extending into proximity to the concave surface of said by-pass lever and movable longitudinally of said surface, said end portion of the arm constituting a fulcrum member adapted to bear at variable points along said concave lever surface for varying the leverage in accordance with the load.

8. The combination of a fuel injection pump and control means therefor comprising a by-pass valve, automatic regulating means for opening said by-pass valve toward the end of the pump stroke, and means independently adjustable to hold said by-pass valve open at the beginning of the pump stroke.

9. The combination of a fuel injection pump and control means therefor comprising a by-pass valve, a lever associated with said pump to open said valve, means cooperative with the plunger of said pump to open said by-pass valve toward the end of said pump stroke, and means cooperative with said lever and said pump to hold said valve open at the beginning of the pump stroke.

10. The combination of a fuel injection pump and control means therefor comprising a by-pass valve, a lever supported by the plunger of said pump and adapted to open said by-pass valve, speed regulated means cooperative with said lever to open said by-pass valve toward the end of the pump stroke, and adjustable means cooperative with said lever to hold said by-pass valve open at the beginning of the pump stroke.

11. The combination of a fuel injection pump and control means therefor, comprising a by-pass valve, a lever supported by the plunger of said pump, a speed regulated fulcrum member for said lever to open said by-pass valve toward the end of the pump stroke, and adjustable means cooperative with said lever to hold said by-pass valve open at the beginning of the pump stroke.

12. The combination of a fuel injection pump and control means therefor, comprising a by-pass valve, a lever supported by the plunger of said pump, speed regulated means cooperative with said lever to open said valve toward the end of the pump stroke, and an adjustable fulcrum for said lever to hold said valve open at the beginning of the pump stroke.

13. The combination of a fuel injection pump and means therefor, comprising a by-pass valve, a lever supported by the plunger of said pump to operate said valve, a speed regulated fulcrum member cooperative with said lever to open said valve toward the end of the pump stroke, and an adjustable fulcrum cooperative with said valve to hold said valve open at the beginning of the pump stroke.

14. The combination of a fuel injection pump and control means therefor, comprising a by-pass valve, a double fulcrumed lever supported by the plunger of said pump, and adjustable fulcra for said lever, the adjustment of one of said fulcra controlling the beginning of the delivery period of the pump and the adjustment of the other controlling the termination of said period.

15. The combination of a fuel injection pump and control means therefor, comprising a double fulcrumed lever supported by the plunger of said pump, a speed regulated fulcrum for said lever, and a second adjustable fulcrum for said lever, the adjustment of one of said fulcra controlling the beginning of the delivery period of the pump, and the adjustment of the other fulcrum controlling the termination of said period.

16. The combination of a fuel injection pump and control means therefor, comprising a by-pass valve, a double fulcrumed lever for operating said by-pass valve, a speed regulated fulcrum for said lever and a second adjustable fulcrum for said lever, the adjustment of one of said fulcra controlling the beginning of the delivery period of the pump and the adjustment of the other controlling the termination of said period.

17. The combination of a fuel injection pump and control means therefor, comprising a by-pass valve, a speed regulated fulcrum for said lever to determine the beginning of the delivery period of the pump, and an adjustable lever cooperative with said lever for determining the termination of said period.

18. The combination of a fuel injection pump and control means therefor, comprising a by-pass valve, double fulcrumed lever supported by the plunger of said pump, a speed regulated fulcrum for said lever determining the beginning of the delivery period of the pump, and a manually adjustable fulcrum for said lever to determine the termination of said period.

19. A fuel injection device for injection type engines including a pump body having a plurality of cylindrical pump bores therein, a supply pump plunger in one of said bores, a fuel injection pump plunger in another of said bores reciprocatory with said supply pump plunger, an intake valve associated with said injection pump plunger, a by-pass valve, a lever mounted on said injection plunger and reciprocatory therewith, a speed-regulated fulcrum for said lever and cooperative therewith to determine the beginning of the delivery period of the pump, and a manually adjustable fulcrum for said lever to determine the termination of said period.

20. In fuel regulation for injection type engines, a pump having a plunger, suction and discharge valves, a by-pass valve, a by-pass operating lever connected to said plunger, and a fulcrum controlled by a governor and adapted to bear on variable points on said lever for varying the leverage with respect to said by-pass valve in accordance with the load, whereby the time of opening and closing said by-pass valve is automatically regulated.

21. In a fuel injection system for oil engines, the combination of a fuel pump, a pipe for receiving and delivering fuel from said pump, means including valve mechanisms operable during the pressure stroke of said pump to begin and terminate the flow of fuel through said pipe, means for actuating said pump, separate means for actuating said valve mechanisms and independently operable devices for varying either the beginning or end of the injection period.

22. In a fuel pump for internal combustion engines, the combination of a cylinder, a fuel-supply, a valve controlling the connection of said fuel-supply with the pump cylinder, independently adjustable means for holding said valve open during the first part of the pressure stroke and independently adjustable means for opening communication between said pump cylinder and said fuel supply during the last part of the said pressure stroke.

23. In a fuel pump for internal combustion engines in combination, a pump cylinder and plunger, a fuel supply for said cylinder, means to adjust communication between the supply and cylinder during the first part of the pressure stroke of said plunger and independently adjustable means to control communication between said fuel supply and cylinder during the last part of said pressure stroke.

In testimony whereof I have signed this specification, as executrix.

HELEN C. PRICE,
*Sole executrix of the estate of William T. Price, deceased.*